United States Patent [19]

Gustafsson

[11] Patent Number: 4,892,182
[45] Date of Patent: Jan. 9, 1990

[54] DEVICE FOR THE ORDERLY REMOVAL OF OBJECTS FROM A CONTAINER

[75] Inventor: Bror Gustafsson, Gislaved, Sweden

[73] Assignee: Aktiebolaget Tetra Pak, Lund, Sweden

[21] Appl. No.: 252,369
[22] PCT Filed: Mar. 10, 1986
[86] PCT No.: PCT/SE86/00101
  § 371 Date: Sep. 7, 1988
  § 102(e) Date: Sep. 7, 1988
[87] PCT Pub. No.: WO87/05275
  PCT Pub. Date: Sep. 11, 1987

[30] Foreign Application Priority Data

Sep. 10, 1984 [SE] Sweden .................. 8404517

[51] Int. Cl.⁴ .................................. B65G 47/12
[52] U.S. Cl. ............................ 198/454; 198/397
[58] Field of Search ............. 198/397, 399, 452, 453, 198/454, 779

[56] References Cited

U.S. PATENT DOCUMENTS

| | | | |
|---|---|---|---|
| 2,609,912 | 9/1952 | Engel | 198/397 |
| 3,024,889 | 3/1962 | Reading | 198/399 X |
| 3,070,207 | 12/1962 | Molins et al. | 198/452 |
| 3,300,021 | 1/1967 | Holmes | 198/779 X |
| 3,658,167 | 4/1972 | Zabroski et al. | 198/397 X |
| 4,082,177 | 4/1978 | Aidlin et al. | 198/453 |
| 4,353,455 | 10/1982 | Mumma et al. | 198/453 X |

OTHER PUBLICATIONS

Research Disclosure, Jun. 1976.

Primary Examiner—Robert J. Spar
Assistant Examiner—James R. Bidwell
Attorney, Agent, or Firm—Davis Hoxie Faithfull & Hapgood

[57] ABSTRACT

A device for the orderly removal of elongated objects (1), such as plastic spoons, from a container (2) holding a disarray of such objects has an endless conveyor belt (3) and an endless spoon-shifting belt (7). On its outer side, the conveyor belt (3) has transverse grooves (6) which extend throughout the entire width of the conveyor belt (3) and the width of which slightly exceeds that of the objects (1). The conveyor belt (3) has an upper run (3a) which passes through the container (2) in order, in its transverse grooves (6), to receive and transport objects (1) from the disarray of objects in the container (2). The shifting belt (7) has a lower run the plane of which is parallel to the plane of the upper run (3a) of the conveyor belt (3), and extends obliquely across the conveyor belt throughout a portion of its width. The shifting belt (7) has shifting pins (10) which are adapted to engage in the transverse grooves (6) in the upper run (3a) of the conveyor belt (3) in order, during synchronous advance of the conveyor belt (3) and the shifting belt (7), to displace objects (1) received in the transverse grooves (6) in the upper run of the conveyor belt, laterally transversely of the direction of travel (P1) of the conveyor belt so as to place the objects straight behind one another at one end of the transverse grooves (6).

7 Claims, 2 Drawing Sheets

DEVICE FOR THE ORDERLY REMOVAL OF OBJECTS FROM A CONTAINER

The present invention relates to a device for the orderly removal of elongated objects from a container holding a disarray of such objects, said device having an endless conveyor belt which is provided on its outer side with transverse grooves extending throughout the entire width of the conveyor belt and having a width slightly exceeding the width of the objects, and which has an upper run extending through the container in order, in its transverse grooves, to receive and transport objects from the disarray of objects in the container.

The invention relates in particular to a device for the orderly removal of plastic spoons and will be described hereinbelow with reference to such use.

In the packaging of certain food products, it is sometimes desirable to attach on each package a plastic spoon which may be used for eating the product. Such attachment of plastic spoons to packages is suitably carried out during the continuous advance of a ribbon consisting of two plastic films between which the plastic spoons are fixed in a uniform manner. The present invention primarily aims at solving the problems which precede the manufacture of such a ribbon of plastic spoons and which substantially reside in properly withdrawing plastic spoons from a disarray of plastic spoons and arranging them such that when being fed out, they are advanced in their transverse direction in a row following upon each other.

The object of the present invention is more generally to provide a device for the orderly removal of elongated objects, such as plastic spoons, from a container holding a disarray of such objects, said device advancing the elongated objects in the transverse direction and in a row following upon each other.

According to the present invention, this object is achieved by means of a device which is of the type stated in the introduction to the specification and which is characterized by an endless spoon-shifting belt having a lower run the plane of which is parallel to the plane of the upper run of the conveyor belt, and extending obliquely across the conveyor belt throughout a portion of its width and having spoon-shifting means which are adapted to engage in the transverse grooves in the upper run of the conveyor belt in order, during synchronous advance of the conveyor belt and the shifting belt, to displace objects received in the transverse grooves in the upper run of the conveyor belt, laterally transversely of the direction of travel of the conveyor belt so as to place the objects straight behind one another at one end of the transverse grooves.

In order to maximize the outfeed capacity of the device i.e. the number of objects withdrawn per unit of time, without necessitating an excessive speed of travel of the conveyor belt, the width of the conveyor belt preferable is considerably greater than the length of the objects. The width of the conveyor belt then is at least three, preferably four times greater than the length of the objects.

In a preferred embodiment of the invention, the upper run of the conveyor belt is inclined upwardly in the direction of travel, and a collecting chute is provided at the side edge of the conveyor belt where said one end of the transverse grooves is located, for collecting objects ejected from the transverse grooves by the spoon-shifting means and returning them to the container.

In another preferred embodiment of the invention, the transverse grooves are so shallow that two or more objects placed on top of each other cannot be accommodated therein, stripper means being provided over the conveyor belt for removing objects entrained on the upper part thereof but not properly received in the transverse grooves.

A plate is preferably arranged close above the upper run of the conveyor belt beside the shifting belt, for preventing objects from moving up on top of each other during the lateral displacement thereof by the shifting means.

A preferred embodiment of the present invention which is especially intended for the outfeed of plastic spoons will now be described in greater detail with reference to the accompanying drawings.

Figure 1:
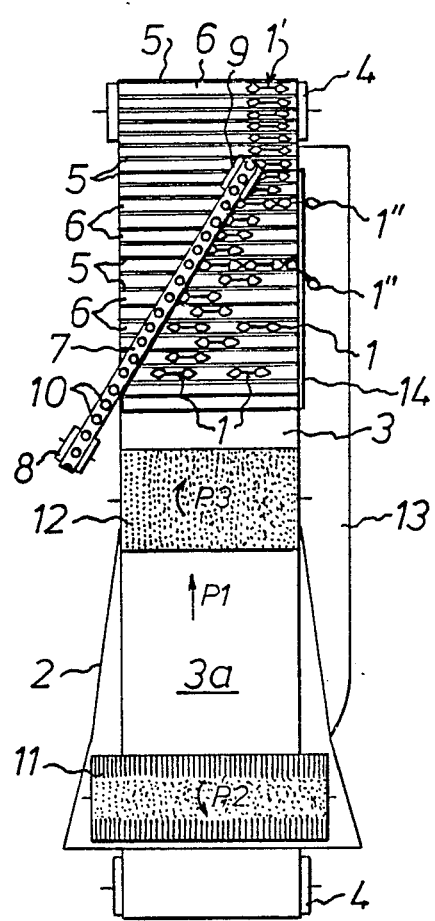
FIG. 1 is a top plan view schematically illustrating a device according to the invention.

The device illustrated in FIG. 1 is intended especially for the orderly removal of plastic spoons 1 (FIGS. 2 and 3) from a container 2 and has an endless conveyor belt 3 passing over two rollers 4. The upper run 3a of the conveyor belt 3, which is inclined upwardly in the direction of travel P1, extends through the lower portion of the container 2 and forms its bottom. On its outer side, the conveyor belt 3 has equidistant transverse ribs 5 extending throughout the entire width of the conveyor belt 3 and defining between them transverse grooves 6 the width of which slightly exceeds the width of the plastic spoons 1. To avoid crowding of the drawing, the ribs 5 and grooves 6 are indicted in FIG. 1 only in the top portion of the upper run 3a. The conveyor belt 3 is however provided with such ribs and grooves throughout its entire length.

An endless spoon-shifting belt 7 whose lower run is located in a plane which is parallel to the plane of the upper run 3a of the conveyor belt 3, passes over a lower roller 8 and an upper roller 9, of which the lower roller 8 is situated to the left of the conveyor belt 3 (as seen in the direction of travel P1), and the upper roller 9 is situated over the upper run 3a of the conveyor belt 3 to the right of the centre line of the conveyor belt 3 (as seen in the direction of travel P1). Thus, the shifting belt 7 extends obliquely across the conveyor belt 3 throughout a portion of its width.

On its outer side, the shifting belt 7 has projecting circular pins 10 which are evenly distributed throughout the entire length of the shifting belt 7. The diameter of the pins 10 is slightly less than the width of the transverse grooves 6. The distance between the pins 10 is so adjusted, in dependence upon the distance between the transverse grooves 6 and upon the obliqueness of the shifting belt 7 in relation to the conveyor belt 3, that the pins 10 projecting downwardly from the lower run of the shifting belt 7, during synchronous advance of the conveyor belt 3 and the shifting belt 7, will successively engage in consecutive transverse grooves 6. Such synchronous movement of the belts is brought about in that the conveyor belt 3 is driven by a motor (not shown) driving the upper roller 4 thereof, the shifting belt 3 being driven by the conveyor belt 3 as a result of the engagement of the pins 10 in the transverse grooves 6.

Figure 2:
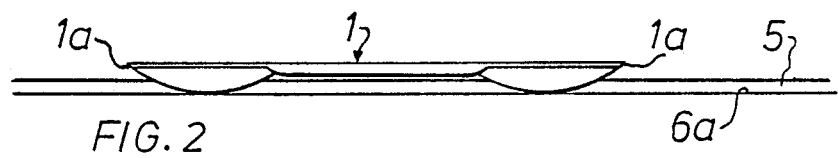
FIG. 2 is a side view illustrating a plastic spoon placed in a groove of a conveyor belt in the device according to FIG. 1.
Figure 3:
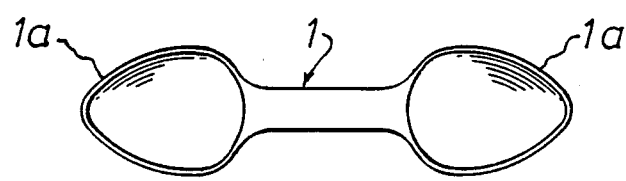
FIG. 3 illustrates the plastic spoon in FIG. 2 from above.

As illustrated in FIGS. 2 and 3, each plastic spoon 1 has two cup-shaped spoon portion 1a which are convex at the rear side of the plastic spoon 1 and concave at the front side thereof. When the plastic spoon 1 is resting on a planar supporting surface with its front side facing the supporting surface, it engages the supporting surface throughout its entire circumference. When the plastic spoon 1 is resting on a planar supporting surface with its rear side facing the supporting surface, it will however engage the supporting surface only with the tops of its convex portions, i.e. at two points or restricted regions, as illustrated in FIG. 2.

In the use of the device, a disarray of plastic spoons 1 is placed in the container 2. A brush 11 arranged in the container 2 is rotated in the direction of the arrow P2 about an axis extending at right angles to the direction of travel P1 of the conveyor belt 3, i.e. such that its underside moves along with the upper run 3a of the conveyor belt 3, in order to make the disarray of plastic spoons in the container 2 looser. The upper run 3a of the conveyor belt 3 entrains plastic spoons 1 from the container 2. The plastic spoons are received in a completely random orientation on the upper run 3a of the conveyor belt 3. Of the plastic spoons 1 which are received in any of the transverse grooves 6, some are thus oriented with their front sides facing downwardly and others with their rear sides facing downwardly. Each plastic spoon 1 resting on the bottom 6a of a transverse groove 6 with its rear side facing downwardly (FIG. 2) will engage, as mentioned above, the bottom 6a of the groove only at two points or restricted regions. Since the convex parts of the spoon portions 1a extend to a higher level than the ribs 5 which define the transverse grooves 6 and the height of which thus is less than the thickness of the plastic spoons 1 (see FIG. 2), the plastic spoon 1 will easily slip out of its transverse groove 6 and back into the container 2.

If the plastic spoon 1 is resting on the bottom 6a of a transverse groove 6 with its front side facing downwardly, it will however be properly retained in the transverse groove 6 and conveyed further upwardly by the conveyor belt 3. Plastic spoons 1 which are placed on the upper run 3a of the conveyor belt 3 but in a transverse groove 6, will mostly slide back into the container 2, whether their front sides or rear sides are facing downwardly.

A brush 12 is provided a certain distance up and along the upper run 3a of the conveyor belt 3 and is rotated in the direction of the arrow P3 about an axis extending at right angles to the direction of travel P1 of the conveyor belt, i.e. such that its underside will move against the upper run 3a of the conveyor belt 3. The brush 12 acts as stripper means removing all plastic spoons that are incorrectly placed on the upper run 3a of the conveyor belt 3, i.e. all plastic spoons not properly received in a transverse groove 6 in a manner to rest on the bottom 6a thereof with their front sides facing downwardly.

The plastic spoons 1 correctly received in the transverse grooves 6 are conveyed onwards by the upper run 3a of the conveyor belt 3, the plastic spoons which are not located as far as the right edge of the conveyor belt 3, as seen in the direction of travel P1, being displaced to the right by the pins 10 of the shifting belt 7 which are engaging in the transverse grooves 6. When the pins 10 by the movement of the shifting belt 7 are moved upwards and out of the transverse grooves 6 at the upper roller 9, the plastic spoons engaged by the respective pins 10 have been shifted to such a position that, after the upper roller 9, the are advanced in a row 1' one after the other. If two or more (in the illustrated Example a maximum of four) plastic spoons are correctly received in one and the same groove, the leftmost plastic spoon is shifted to the above-mentioned position at the right margin of the conveyor belt 3. During this displacement, all the other plastic spoons received in the same transverse groove 6 are shifted to the right out of the transverse groove 6 and into a collecting chute 13 leading down into the container 2. In FIG. 1, such ejection is illustrated by two plastic spoons referenced 1". In order that the plastic spoons 1 in one and the same transverse groove 6 should not be moved up on top of each other during the lateral shifting, a plate 14 is provided close above the upper run 3a of the conveyor belt 3 to the right of the shifting belt 7. In the illustrated Example, the plate 14 is made of a transparent material.

The device now described thus provides for an orderly removal of plastic spoons 1 from a disarray of plastic spoons in the container 2, the plastic spoons being so arranged that when being fed out, they are facing in the same direction (front side downwardly) and are placed straight behind one another in a row 1'.

I claim:

1. Device for the orderly removal of elongated objects (1), such as plastic spoons, from a container (2) holding a disarray of such objects, said device having an endless conveyor belt (3) which is provided on its outer side with transverse ribs (5) extending throughout the entire width of the conveyor belt (3) and defining between -hem transverse grooves (6) having a width slightly exceeding the width of the objects (1), and which has an upper run (3a) inclined upwardly in the direction of travel (P1) and extending through the container (2) in order, in its transverse grooves (6), to receive and transport objects (1) resting on the bottom (6a) of the grooves formed on the conveyor belt (3), from the disarray of objects in the container (2), characterized by an endless shifting belt (7) having a lower run the plane of which is parallel to the plane of the upper run (3a) of the conveyor belt (3), and extending obliquely across the conveyor belt throughout a portion of its width and having projecting pins (10) adapted to engage in the transverse grooves (6) in the upper run (3a) of the conveyor belt (3) in order, during advance of the conveyor belt (3), to drive the shifting belt (7) and shift objects (1) received in the transverse grooves (6) in the upper run of the conveyor belt, laterally transversely of the direction of travel (P1) of the conveyor belt so as to place the objects straight behind one another at one end of the transverse grooves (6).

2. Device as claimed in claim 1, characterized in that the width of the conveyor belt (3) considerably exceeds the length of the objects (1).

3. Device as claimed in claim 2, characterized in that the width of the conveyor belt (3) is at least three, preferably four times greater than the length of the objects (1).

4. Device as claimed in claim 1, characterized in that a collecting chute (13) is provided at the lateral edge of the conveyor belt (3) where said one end of the transverse grooves (6) is located, for collecting objects (1")

ejected from the transverse grooves (6) by the shifting means (10) and returning them to the container (2).

5. Device as claimed in any one of the preceding claims, characterized in that the transverse grooves (6) are so shallow that two or more objects (1) placed on top of each other cannot be accommodated therein.

6. Device as claimed in claim 5, characterized in that stripper means (12) is arranged over the conveyor belt (3) for removing objects (1) that are entrained on the upper run (3a) thereof but not properly accommodated in its transverse grooves (6).

7. Device as claimed in claim 6, characterized in that a plate (14) is arranged close above the upper run (3a) of the conveyor belt (3) beside the shifting belt (7) for preventing objects (1), when being laterally displaced by the shifting means (10), from moving up on top of each other.

* * * * *

UNITED STATES PATENT AND TRADEMARK OFFICE
CERTIFICATE OF CORRECTION

PATENT NO. : 4,892,182
DATED : January 9, 1990
INVENTOR(S) : Gustafsson, Bror

It is certified that error appears in the above-identified patent and that said Letters Patent is hereby corrected as shown below:

In the Claims:

Claim 1, col. 4, line 36, "-hem" should be --them--.

Signed and Sealed this

Twenty-sixth Day of February, 1991

Attest:

HARRY F. MANBECK, JR.

*Attesting Officer*    *Commissioner of Patents and Trademarks*